(12) United States Patent
Thomas et al.

(10) Patent No.: US 9,370,842 B2
(45) Date of Patent: Jun. 21, 2016

(54) METHODS FOR STRIPPING AND MODIFYING SURFACES WITH LASER-INDUCED ABLATION

(71) Applicant: GENERAL LASERTRONICS CORPORATION, San Jose, CA (US)

(72) Inventors: James W. Thomas, Los Altos, CA (US); Robert L. Cargill, San Jose, CA (US); Mitchell R. Wool, Sunnyvale, CA (US)

(73) Assignee: General Lasertronics Corporation, San Jose, CA (US)

( * ) Notice: Subject to any disclaimer, the term of this patent is extended or adjusted under 35 U.S.C. 154(b) by 328 days.

(21) Appl. No.: 13/910,826

(22) Filed: Jun. 5, 2013

(65) Prior Publication Data

US 2013/0270234 A1 Oct. 17, 2013

Related U.S. Application Data

(62) Division of application No. 12/077,876, filed on Mar. 21, 2008, now Pat. No. 8,536,483.

(60) Provisional application No. 60/919,707, filed on Mar. 22, 2007, provisional application No. 60/958,737, filed on Jul. 9, 2007.

(51) Int. Cl.
*G01B 11/30* (2006.01)
*B23K 26/00* (2014.01)
(Continued)

(52) U.S. Cl.
CPC ........... *B23K 26/0081* (2013.01); *B08B 7/0042* (2013.01); *B23K 26/03* (2013.01); *B23K 26/032* (2013.01); *B23K 26/0665* (2013.01);
(Continued)

(58) Field of Classification Search
CPC ....................................................... G01B 11/30
USPC ......... 356/600, 445, 446, 237, 601, 337, 338; 250/492.1; 134/1; 219/121.6, 121.85
See application file for complete search history.

(56) References Cited

U.S. PATENT DOCUMENTS 3,626,141 A 12/1971 Daly
3,657,707 A 4/1972 McFarland et al.
(Continued)

FOREIGN PATENT DOCUMENTS

FR 2 661 371 4/1990
FR 2 689 423 4/1990
(Continued)

OTHER PUBLICATIONS

"Photonic Cleaning Process Moves to Heavy Industry," Mar. 1997, p. 22, Photonics Spectra.
(Continued)

*Primary Examiner* — Samuel M Heinrich
(74) *Attorney, Agent, or Firm* — Haverstock & Owens LLP

(57) ABSTRACT

A coating removal apparatus removes a coating from a surface. The apparatus has a movable scanning head and scanning optics. The scanning head is movable in one dimension, and the scanning optics adjust in two dimensions to compensate for movement of the scanning head to implement long range scanning with a uniform scanning pattern. Further, a surface roughness is determined by measuring specular and scattered reflections at various angles. For composite surfaces, the apparatus utilizes UV laser radiation and a controlled atmosphere to remove coating and alter the chemical characteristics at the surface.

4 Claims, 11 Drawing Sheets

(51) Int. Cl.
  *B08B 7/00* (2006.01)
  *B23K 26/03* (2006.01)
  *B23K 26/06* (2014.01)
  *B23K 26/08* (2014.01)

(52) U.S. Cl.
  CPC ........... *B23K26/082* (2015.10); *B23K 26/0807* (2013.01); *B23K 26/142* (2015.10); *G01B 11/303* (2013.01); *G01B 11/30* (2013.01)

(56) References Cited

U.S. PATENT DOCUMENTS

| | | | |
|---|---|---|---|
| 3,771,880 A * | 11/1973 | Bennett | G01N 21/55 356/446 |
| 3,843,865 A | 10/1974 | Nath | |
| 3,941,973 A | 3/1976 | Luck, Jr. et al. | |
| 4,114,018 A | 9/1978 | Von Allmen et al. | |
| 4,136,779 A * | 1/1979 | Bieringer | B07C 5/3408 209/524 |
| 4,148,057 A | 4/1979 | Jesse | |
| 4,207,874 A | 6/1980 | Choy | |
| 4,328,068 A | 5/1982 | Curtis | |
| 4,398,790 A | 8/1983 | Righini et al. | |
| 4,449,043 A | 5/1984 | Husbands | |
| 4,521,070 A | 6/1985 | Sottini et al. | |
| 4,543,477 A | 9/1985 | Doi et al. | |
| 4,564,736 A | 1/1986 | Jones et al. | |
| 4,566,937 A | 1/1986 | Pitts | |
| 4,584,455 A | 4/1986 | Tomizawa | |
| 4,588,885 A | 5/1986 | Lovoi et al. | |
| 4,644,948 A | 2/1987 | Lang et al. | |
| 4,654,532 A | 3/1987 | Hirschfeld | |
| 4,665,377 A | 5/1987 | Harpaintner | |
| 4,671,848 A | 6/1987 | Miller et al. | |
| 4,676,586 A | 6/1987 | Jones et al. | |
| 4,687,918 A | 8/1987 | Hughes et al. | |
| 4,695,698 A | 9/1987 | Mayor et al. | |
| 4,707,073 A | 11/1987 | Kocher | |
| 4,729,621 A | 3/1988 | Edelman | |
| 4,737,004 A | 4/1988 | Amitay et al. | |
| 4,737,628 A | 4/1988 | Lovoi | |
| 4,749,840 A | 6/1988 | Piwczyk | |
| 4,756,756 A | 7/1988 | Cassat | |
| 4,762,385 A | 8/1988 | Fuse | |
| 4,799,755 A | 1/1989 | Jones | |
| 4,807,954 A | 2/1989 | Oyamada et al. | |
| 4,818,049 A | 4/1989 | Assenheim et al. | |
| 4,818,062 A | 4/1989 | Scifres et al. | |
| 4,821,943 A | 4/1989 | Gaudin et al. | |
| 4,842,360 A | 6/1989 | Caro et al. | |
| 4,844,574 A | 7/1989 | Chande | |
| 4,844,947 A | 7/1989 | Kasner et al. | |
| 4,859,075 A | 8/1989 | Sutter, Jr. et al. | |
| 4,876,444 A | 10/1989 | Field | |
| 4,880,959 A | 11/1989 | Baum et al. | |
| 4,900,891 A | 2/1990 | Vega et al. | |
| 4,920,994 A | 5/1990 | Nachbar | |
| 4,928,695 A | 5/1990 | Goldman et al. | |
| 4,931,616 A | 6/1990 | Usui et al. | |
| 4,944,567 A | 7/1990 | Kuper et al. | |
| 4,960,988 A | 10/1990 | Simms | |
| 4,986,664 A | 1/1991 | Lovoi | |
| 4,994,639 A | 2/1991 | Dickinson et al. | |
| 5,006,268 A | 4/1991 | Griffaton | |
| 5,014,207 A | 5/1991 | Lawton | |
| 5,040,479 A | 8/1991 | Thrash | |
| 5,068,750 A | 11/1991 | Cook et al. | |
| RE33,777 E | 12/1991 | Woodroffe | |
| 5,081,350 A | 1/1992 | Iwasaki et al. | |
| 5,107,445 A | 4/1992 | Jensen et al. | |
| 5,113,802 A | 5/1992 | Le Blanc | |
| 5,151,134 A | 9/1992 | Boquillon et al. | |
| 5,194,723 A | 3/1993 | Cates et al. | |
| 5,210,944 A | 5/1993 | Monson et al. | |
| 5,216,808 A | 6/1993 | Martus et al. | |
| 5,229,593 A | 7/1993 | Cato | |
| 5,245,682 A | 9/1993 | Ortiz et al. | |
| 5,281,798 A | 1/1994 | Hamm et al. | |
| 5,291,570 A | 3/1994 | Filgas et al. | |
| 5,293,023 A | 3/1994 | Haruta et al. | |
| 5,328,517 A | 7/1994 | Cates et al. | |
| 5,333,218 A | 7/1994 | Ortiz et al. | |
| 5,355,063 A | 10/1994 | Boone et al. | |
| 5,364,390 A | 11/1994 | Taboada et al. | |
| 5,371,582 A | 12/1994 | Toba et al. | |
| 5,373,140 A | 12/1994 | Nagy et al. | |
| 5,386,112 A | 1/1995 | Dixon | |
| 5,395,362 A | 3/1995 | Sacharoff et al. | |
| 5,446,256 A | 8/1995 | Cartry | |
| 5,451,765 A | 9/1995 | Gerber | |
| 5,526,167 A | 6/1996 | Peng | |
| 5,531,857 A | 7/1996 | Engelsberg et al. | |
| 5,548,113 A | 8/1996 | Goldberg et al. | |
| 5,558,666 A | 9/1996 | Dewey et al. | |
| 5,571,335 A | 11/1996 | Lloyd | |
| 5,581,346 A | 12/1996 | Sopori | |
| 5,589,089 A | 12/1996 | Uesugi | |
| 5,592,879 A | 1/1997 | Waizmann | |
| 5,610,753 A | 3/1997 | Kessler et al. | |
| 5,613,509 A | 3/1997 | Kolb | |
| 5,637,245 A | 6/1997 | Shelton | |
| 5,643,476 A | 7/1997 | Garmire et al. | |
| 5,656,186 A | 8/1997 | Mourou et al. | |
| 5,662,762 A | 9/1997 | Ranalli | |
| 5,767,479 A | 6/1998 | Kanaoka | |
| 5,780,806 A | 7/1998 | Ferguson et al. | |
| 5,784,162 A | 7/1998 | Cabib et al. | |
| 5,790,046 A | 8/1998 | Blossfeld | |
| 5,805,275 A | 9/1998 | Taylor | |
| 5,845,646 A | 12/1998 | Lemelson | |
| 5,864,114 A | 1/1999 | Fukuda | |
| 5,889,253 A | 3/1999 | Kanaoka | |
| 5,986,234 A | 11/1999 | Matthews et al. | |
| 6,040,549 A | 3/2000 | Kanaoka | |
| 6,165,170 A | 12/2000 | Wynne et al. | |
| 6,215,094 B1 | 4/2001 | Dausinger et al. | |
| 6,285,002 B1 | 9/2001 | Ngoi et al. | |
| 6,288,362 B1 | 9/2001 | Thomas et al. | |
| 6,313,435 B1 | 11/2001 | Shoemaker et al. | |
| 6,323,457 B1 | 11/2001 | Jung | |
| 6,347,976 B1 | 2/2002 | Lawton et al. | |
| 6,383,177 B1 | 5/2002 | Balle-Petersen et al. | |
| 6,384,370 B1 | 5/2002 | Tsunemi et al. | |
| 6,414,263 B1 | 7/2002 | Uchida | |
| 6,437,285 B1 | 8/2002 | Thomas et al. | |
| 6,494,960 B1 | 12/2002 | Macdonald et al. | |
| 6,635,844 B2 | 10/2003 | Yu | |
| 6,664,499 B1 | 12/2003 | Brink et al. | |
| 6,864,478 B2 | 3/2005 | Schroder | |
| 6,924,457 B2 | 8/2005 | Koyama et al. | |
| 6,927,917 B2 | 8/2005 | Kimura | |
| 7,009,141 B1 | 3/2006 | Wool et al. | |
| 7,265,033 B2 | 9/2007 | Shigematsu et al. | |
| 7,397,014 B2 | 7/2008 | Hart et al. | |
| 7,407,591 B2 | 8/2008 | De Battisti et al. | |
| 7,408,130 B2 | 8/2008 | Sonoda et al. | |
| 7,452,476 B2 | 11/2008 | Bayer et al. | |
| 7,525,065 B2 | 4/2009 | Engler et al. | |
| 7,535,565 B1 | 5/2009 | Viertl et al. | |
| 7,633,033 B2 | 12/2009 | Thomas et al. | |
| 7,800,014 B2 | 9/2010 | Thomas et al. | |
| 7,867,404 B2 | 1/2011 | Deutsch | |
| 8,030,594 B2 | 10/2011 | Thomas et al. | |
| 8,182,609 B1 | 5/2012 | Le Claire et al. | |
| 8,246,172 B2 | 8/2012 | Amano | |
| 8,348,655 B2 | 1/2013 | Kuzusako et al. | |
| 8,604,380 B2 | 12/2013 | Howerton et al. | |
| 8,687,189 B2 | 4/2014 | Agrawal et al. | |
| 8,980,639 B2 | 3/2015 | Clark et al. | |
| 2002/0134770 A1 | 9/2002 | Freiwald et al. | |
| 2002/0153361 A1 | 10/2002 | Sakamoto et al. | |
| 2003/0040164 A1 | 2/2003 | Inoue et al. | |
| 2003/0062349 A1 | 4/2003 | Suh et al. | |
| 2003/0169167 A1 | 9/2003 | Fey et al. | |

(56) References Cited

U.S. PATENT DOCUMENTS

| | | |
|---|---|---|
| 2004/0045497 A1 | 3/2004 | Kriews et al. |
| 2004/0057047 A1 | 3/2004 | Knebel |
| 2005/0072612 A1 | 4/2005 | Maggio |
| 2005/0150878 A1 | 7/2005 | Thomas et al. |
| 2005/0224474 A1 | 10/2005 | Kilburn |
| 2006/0000488 A1 | 1/2006 | Claar et al. |
| 2006/0151433 A1 | 7/2006 | Chang et al. |
| 2006/0186098 A1 | 8/2006 | Caristan |
| 2006/0273896 A1 | 12/2006 | Kates |
| 2007/0000885 A1 | 1/2007 | Thomas et al. |
| 2007/0051708 A1 | 3/2007 | Talwar et al. |
| 2007/0224768 A1 | 9/2007 | Chaplick et al. |
| 2008/0006615 A1 | 1/2008 | Rosario et al. |
| 2009/0007933 A1 | 1/2009 | Thomas et al. |
| 2009/0242527 A1 | 10/2009 | Anger |
| 2010/0033817 A1 | 2/2010 | Ono |
| 2010/0093112 A1 | 4/2010 | Takagi et al. |
| 2010/0134628 A1 | 6/2010 | Pfitzner et al. |
| 2010/0176101 A1 | 7/2010 | Costin et al. |
| 2010/0243625 A1 | 9/2010 | Osako |
| 2010/0272961 A1 | 10/2010 | Costin, Jr. |
| 2011/0088720 A1 | 4/2011 | Varanasi et al. |
| 2011/0168679 A1 | 7/2011 | Qi et al. |
| 2011/0186553 A1 | 8/2011 | Chung |
| 2013/0036380 A1 | 2/2013 | Symons |
| 2013/0136744 A1 | 5/2013 | Bouche et al. |
| 2013/0199732 A1 | 8/2013 | Niwa et al. |

FOREIGN PATENT DOCUMENTS

| | | |
|---|---|---|
| GB | 2 246 099 A | 1/1992 |
| GB | 2 402 230 B | 12/2004 |
| GB | 2481190 A | 12/2011 |
| JP | 01203090 A | 8/1989 |
| JP | 02263854 A | 10/1990 |
| JP | 05082276 A | 4/1993 |
| JP | 05138377 A | 6/1993 |
| JP | 10309516 A | 11/1998 |
| JP | 2000103607 A | 4/2000 |
| JP | 2001300755 A | 1/2001 |
| JP | 200168829 A | 3/2001 |
| JP | 361161781 A | 6/2003 |
| WO | 8301400 | 4/1983 |
| WO | 2004039531 A2 | 10/2004 |

OTHER PUBLICATIONS

Freiwald et al., "Laser Ablation of Contaminants from Concrete and Metals Surfaces," Dec. 1994, pp. 1-53, F2 Associates, Incorporated.

Inta, "Radiant Energy Based Cleaning and Coating Removal Technology Comparison," Aug. 8, 1994, pp. 1-26 Manufacturing Technology Special Advanced Studies.

Barone, Philip A. "Automated Laser Paint Stripping (ALPS)," Jun. 1, 1992, pp. AD92-206-1 through AD92-206-17, Society of Manufacturing Engineers.

"The Company The Technology," Apr. 1997, General Lasertronics Corporation.

"Lasertronics Corporate Overview," Apr. 1997, Lasertronics Engineering Excellence.

"Lasertronics Aircraft Paint Removal," Apr. 1997, Lasertronics Engineering Excellence.

"Lasertronics Radiation/Medical Decontamination," Apr. 1997, Lasertronics Engineering Excellence.

"Lasertronics Grafitti Abatement," Apr. 1997, Lasertronics Engineering Excellence.

"Lasertronics Lead-Based Paint Removal," Apr. 1997, Lasertronics Engineering Excellence.

Driscoll et al., "Handbook of Optics," Dec. 1978, pp. 13-6 through 13-10, McGraw-Hill Book Company.

Liu et al., "Paint Removal Using Lasers," Jul. 20, 1995, pp. 4409-4414, Applied Optics, vol. 34, No. 21.

Lovoi, Paul, "Laser Paint Stripping Offers Control and Flexibility," Nov. 1994, pp. 75-80, Laser Focus World.

Bonkowski et al., "CW Laser Paint Stripping," Aug. 1991, pp. 1-20, The Laser Institute and National Science and Engineering Research Council.

Lovoi, Paul, "Laser/Robot Paint Stripping, Laser Ablation Coating Removal," Apr. 1988, International Technical Associates.

\* cited by examiner

US 9,370,842 B2

METHODS FOR STRIPPING AND MODIFYING SURFACES WITH LASER-INDUCED ABLATION

RELATED APPLICATIONS

This application is a divisional of U.S. patent application Ser. No. 12/077,876, filed on Mar. 21, 2008, and entitled "Methods for Stripping And Modifying Surfaces With Laser-Induced Ablation," which claims priority of U.S. provisional application Ser. No. 60/919,707, filed Mar. 22, 2007, and entitled "Preferred Methods for Stripping and Modifying Surfaces with Laser-induced Ablation," by the same inventors. This application incorporates U.S. patent application Ser. No. 12/077,876, filed Mar. 21, 2008, and entitled "Methods for Stripping And Modifying Surfaces With Laser-Induced Ablation, and U.S. provisional application Ser. No. 60/919,707, filed Mar. 22, 2007, and entitled "Preferred Methods for Stripping and Modifying Surfaces with Laser-induced Ablation" in their entirety by reference.

This application also claims priority of U.S. provisional application Ser. No. 60/958,737, filed Jul. 9, 2007, and entitled "Apparatus and method for Ultraviolet Laser Surface Treatment of Composite Materials," by a common inventor. This application incorporates U.S. provisional application Ser. No. 60/958,737, filed Jul. 9, 2007, and entitled "Apparatus and method for Ultraviolet Laser Surface Treatment of Composite Materials" in its entirety by reference.

FIELD OF THE INVENTION

The invention relates to ablating a coating using a laser. In particular, the invention relates to removing a coating from a surface using a laser and light sensing system.

BACKGROUND OF THE INVENTION

Delivery of certain wavelengths of radiant energy is facilitated by transmission along flexible silica fibers. The energy is dispersed from the emitting end of an optical fiber in a widening cone. The energy intensity is generally symmetric about the central fiber axis (e.g., uniformly distributed in azimuth) at the emitting end. The distribution of emitted energy orthogonal to the azimuth angle is highly non-uniform, with highest intensity at the central axis, rapidly decreasing with increasing divergence angle relative to the central fiber axis, sometimes approximated by a power cosine function of the divergence angle.

Energy beam guiding structures are known that use refractive media (e.g. optical lenses) in combination with movable reflective media (e.g. mirrors) to focus and direct diverging radiant energy disposed around the input beam axis to a target of interest. The optical lenses typically convert (collimate) the dispersing radiant energy to a second beam with the radiant energy directed more parallel to the input beam axis. The second beam's energy is distributed over a cross-sectional area defined on a target surface oriented in a transverse plane intersecting the optical axis of the second beam. The size of the defined area is typically limited by the diameter of the lenses. The movable reflective media are coupled to transporting mechanisms and are positioned to modify the direction of the collimated beam as a function of time, typically in a raster pattern scan mode. The dynamic positioning of the reflective media is generally arranged so that the energy of the second beam, averaged over a multiple number of scan cycles, is distributed as a less intense, more uniform energy intensity distribution over the desired target surface area. In addition, one or more condensing (focusing) lens can be used to focus the collimated beam energy to a fine point at the target's surface. Combinations of mirrors, prisms, and/or lenses are used to achieve both effects. The typical objective of these combined reflective and refractive elements is to modify the intensity distribution of the beam over the width of a limited transverse area and to move the scan area over a target surface to produce a less intense, more uniform, energy intensity distribution over a larger area.

In previous laser scanning heads, the beam is typically reflected from two raster scanning mirrors movably mounted in a housing where they are disposed with the first minor intercepting the input beam, reflecting it to the second minor, which then reflects the beam toward the target. In other previous laser scanning heads, the beam is refracted through moving optical components to direct the beam toward the target.

Laser-based coating removal systems use pulses of light from high power lasers to ablate or vaporize the paint or other coating from a surface. Each pulse removes the coating from a small region, typically 0.1 to 100 square mm. The laser is pointed to a different area after each pulse, where the removal process is repeated until the entire surface is cleaned.

An advantage of lasers for coating removal is that each laser pulse removes a predictable portion of the thickness of the coating, in the small region impacted by the pulse. This opens the possibility of selective stripping where, for example, the topcoat could be removed but not the primer.

In an attempt to provide uniform removal of the coating, the beam is scanned over the surface in a controlled manner. However, current scanning head configurations and methods of removing the coating provide only limited success in achieving uniform coating removal.

Further, current laser-based coating removal techniques are less effective when applied to newer composite materials, such as fiber-reinforced polymer composites. The use of fiber-reinforced polymer composites in a variety of modern products highlights significant technical advantages that these materials exhibit. In comparison to metals and conventional plastics, composites have high strength-to-weight ratios, high elastic modulus, and are very durable. For these reasons, composite materials have been employed in an increasing number of demanding automotive, sports equipment, and aerospace applications. Composite materials have also demonstrated significant advantages in military "stealth" aircraft applications where light weight, structural efficiency and compatibility with "low-observables" (LO) coating systems are critical.

Composite materials have also been employed in commercial aircraft applications, including fuselage and wing fairings, stabilizers, rudder structures, and fuselage access hatches. In some applications, wide-body aircraft employ carbon fiber-reinforced plastic (CFRP) composite as the primary load-bearing material in the fuselage and wing structures. The use of composite materials confers a number of performance advantages in comparison to all previous generations of commercial (metal) aircraft, notably including exceptional gains in fuel efficiency.

The CFRP-type composite material employed in aerospace applications is processed and fabricated with entirely different methods than the traditional riveted aluminum structure that has previously dominated airframe construction. The basic CFRP composite material is manufactured by encapsulating directionally oriented carbon fibers with an epoxy-type resin. Typically, woven carbon fiber "tapes" or "pre-forms" are positioned over form tools or mandrels and are subsequently infused with the epoxy resin using vacuum-assisted methods. The entire assembly is then subjected to heat and pressure in an autoclave vessel in order to cure the epoxy resin under controlled conditions.

This technology allows manufacturers to fabricate complex airframe structures from multiple composite pieces including skins, bulkheads, stiffening ribs, stringers, and doubler plates. The heat and pressure generated by the autoclave process facilitates high-strength adhesive bonds between these various composite pieces as the complete assembly is fabricated. This allows the manufacturer to build large, complex composite structures that essentially function as a single piece.

Although composite materials provide technical advantages in a variety of applications, manufacturers have had to confront several problems in fabricating useful products at an acceptable cost. These problems include the cleanliness and surface chemistry of the composite material. In most composite manufacturing processes, mold release agents and ambient hydrocarbon aerosols are deposited on the composite surface as undesirable contaminants. These contaminants degrade the mechanical properties of adhesive bond joints as well as the adhesion of coatings on the composite surface. It is well known to those skilled in the art that surface cleanliness and surface chemistry are critically important to achieving consistent adhesive bonds as well as the adhesion of high-performance coatings that extend the life of composite structures in operational service.

Conventional approaches to aerospace composite surface cleaning and surface preparation include hand-applied abrasive media and media-blast techniques using a solvent rinse. These methods employ abrasive media to abrade the surface and thereby remove contaminated matrix material from the composite surface. In addition to being inherently labor-intensive, the use of abrasive processes for composite surface preparation entails other disadvantages, including unintended damage to the composite substrate, substantial variability in process outcome that is difficult to control, large waste streams, and difficulty in thoroughly cleaning the abrasive-treated substrate.

Aerospace and laser manufacturers have attempted to use laser-based processes for surface treatments of composite materials, but these developments have not proven to be successful. A fundamental problem in this regard is the fact that the infrared (IR) lasers employed in these processes are not well suited to coating and bonding pre-treatments of composite materials. Although IR lasers are used for most industrial cutting, welding, and coating removal applications, the infrared radiation they produce is readily transmitted through the epoxy matrix of many composite materials. This means that IR lasers cannot readily produce the closely controlled laser effects in a very shallow layer of the substrate surface that are required for coating and bonding pre-treatments of aerospace composites.

Conventional laser-based coating removal techniques are also limited in their ability to accommodate certain surface preparation requirements. In preparing a surface for paint, for example, some applications require that, in addition to being clean, the surface should have a texture. That is, some paint sticks better if the surface is not perfectly flat. Lasers are capable of creating small divots in the surface that enhance paint adhesion. The difficulty is in controlling the degree of surface roughness induced by the laser and determining if a desired surface roughness has been achieved.

SUMMARY OF THE INVENTION

Embodiments of the present invention are directed to a coating removal apparatus for and a method of removing a coating from a surface. The coating removal apparatus includes a laser path, an illumination path, and a reflected light path. Laser light is provided from a laser source to the surface via the laser path. Light to illuminate the surface is provided from one or more illuminators to the surface via the illumination path. Reflected light resulting from the light illumination impinging the surface is directed from the surface to a photosensitive detector via the reflected light path. In some embodiments, laser scanning optics also function as the illumination path for the light illumination directed onto the surface. In other embodiments, the illumination path is separate from the laser path. The light illumination is reflected off the surface and collected by the photosensitive detector to achieve a known correspondence between the scanning optics conditions and the local surface color and/or texture parameters.

Each laser pulse generated by the laser source is directed by scanning optics to a predetermined position on the coated surface. Where the laser pulse impinges the position, the coating at the position is ablated. The scanning optics are then adjusted to direct subsequent laser light to other positions on the surface according to a predetermined pattern. The exact pattern of the coating to be removed can be any desired pattern. Control logic within the apparatus determines the desired pattern according to a stored algorithm or program. Control signals are sent to the scanning optics, which include various optical elements and actuating means for moving some or all of these elements, thereby controlling the direction of the laser light onto the surface.

In some embodiments, the coating removal apparatus is configured with a movable scanning head that includes the scanning optics. In some embodiments, the scanning head is movable in a first direction, for example the y-direction relative to the surface, and the scanning optics are configured to move in two directions, for example the y-direction and also the x-direction relative to the surface. Such a configuration enables a long range scanning path in the first direction corresponding to the scanning head movement, while implementing a uniform coating removal pattern.

In some embodiments, the coating removal apparatus is configured to remove coating to achieve a desired surface roughness. The surface roughness is measured in situ, in real-time as the coating removal process occurs. A roughness measuring laser source provides a laser light to the surface, thereby generating laser specular reflection and scattered reflections. The magnitude of the reflections at various angles are detected and measured. The measured results are used to calculate the surface roughness.

In some embodiments, the surface is composed of materials and/or structures that infrared (IR) laser light used to remove coatings merely passes through without the desired effects. When the surface to be removed is composed of such materials and/or structures, the coating removal apparatus includes an ultraviolet (UV) laser system. UV laser light interacting with the surface causes photoablation effects. Such effects essentially vaporize a volume of the surface material as a gaseous flow or a low-temperature plasma.

BRIEF DESCRIPTION OF THE DRAWINGS

Embodiments of the coating removal device are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the coating removal apparatus utilize various optics paths to provide laser pulses to a coated surface, to direct a light illumination to the coated surface, and to direct the reflected light from the coated surface to a photosensitive detector and analyzer. In some embodiments, the apparatus is an integrated device including a laser source, a beam splitter, scanning optics including actuating means for adjusting the scanning optics, a waste removal apparatus, one or more light illuminators, a photosensitive detector, a comparator, and a control logic circuit. In other embodiments, the apparatus is divided into separate components, such as a head component and a body component, each of which is coupled via fiber optic cables and/or power lines.

Figure 1:
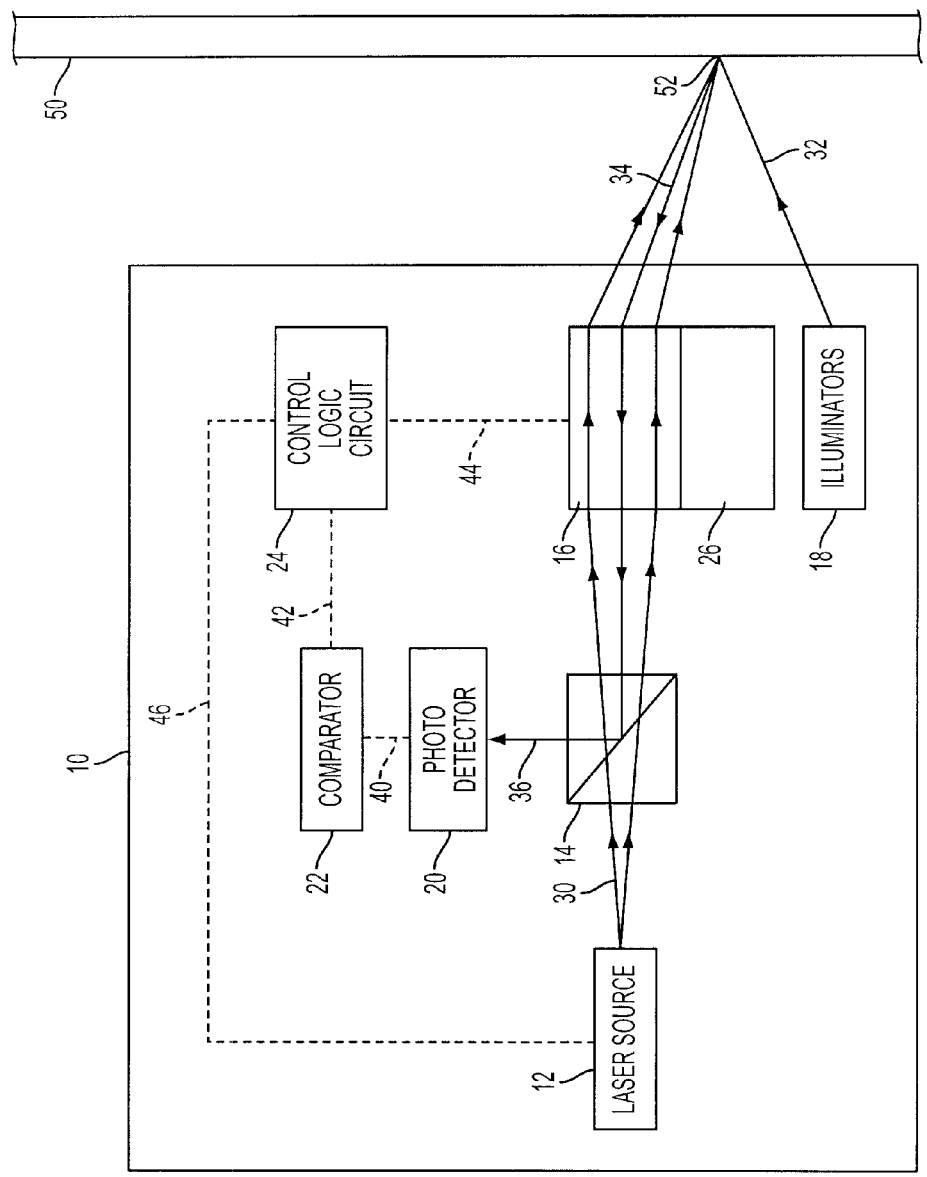
FIG. 1 illustrates an exemplary block diagram of a coating removal device according to an embodiment of the present invention.

FIG. 1 illustrates an exemplary block diagram of a coating removal device according to an embodiment of the present invention. The coating removal device 10 is an integrated device that includes a laser source 12, a beam splitter 14, scanning optics 16, illuminators 18, a photosensitive detector 20, a comparator 22, a control logic circuit 24, and a waste collector 26. Within FIG. 1, the solid lines between elements represent optical paths and the dashed lines represent data signal paths. The laser source 12 generates a laser pulse, represented as light 30. Light 30 passes through the beam splitter 14 to the scanning optics 16. Within the scanning optics 16, the light 30 is aligned and focused such that the light 30 impinges a specific position 52 on a coated surface 50. A laser path is defined as the path the laser pulse traverses to reach the coated surface 50. In reference to FIG. 1, the laser path includes the path through the beam splitter 14 and the scanning optics 16.

As is well known in the art of laser optics, a surface area of the position 52 onto which the light 30 impinges can be made as small or as large as necessary to perform the desired functionality of ablating the coating at the position 52. Increasing or decreasing the impinging surface area respectively decreases or increases the light intensity delivered onto the surface area. The amount of light intensity is an adjustable parameter which is used to meet various application specifications. It is understood that the light intensity delivered over a given surface area depends not only on the given surface area but also in part to the laser source specifications and loss within the integrated apparatus.

Upon impinging the position 52, the light 30 ablates a portion of the coating corresponding to the position 52. It is anticipated that each laser pulse removes a uniform amount of coating. The amount of coating removed includes the surface area impinged by the light 30 and a depth of the coating at the position 52. An anticipated depth can be calculated based on the intensity of the light 30, the surface area impinged, the nature of the coating, etc. In operation, the actual depth of the coating that is removed can vary from the calculated depth. Underneath the coating to be removed is either a different coating (an undercoating) comprising a different material or a different color, or the original surface material to which the coating was originally applied. In either case, it is anticipated that the undercoating or original surface reflects a wavelength of light different than that reflected by the coating being removed. As such, it can be determined if the coating to be removed is in fact completely removed by measuring a wavelength of light reflected off the position 52. The illuminators 18 provide a light illumination 32 to the position 52 on the coated surface 50. Light illumination 32 is reflected off the position 52 as reflected light 34 and through the scanning optics 16 to the beam splitter 14. At the beam splitter 14, the reflected light 34 is split, or re-directed, from the laser path as re-directed reflected light 36. The light 36 is directed to the photosensitive detector 20 where characteristics of the reflected light are measured. Data corresponding to the measured characteristics is sent from the photosensitive detector 20 to the comparator 22 via a data line 40.

An illumination path is defined as the path the light illumination traverses from the illuminators 18 to the surface 50. In reference to FIG. 1, the illumination path is independent of laser path.

A reflected light path is defined as the path the reflected light traverses from the coated surface 50 to the photosensitive sensor 20. In reference to FIG. 1, the reflected light path includes the path through the scanning optics 16 and the beam splitter 14. In the coating removal device 10, the reflected light path includes the optics that comprise the laser path.

The comparator 22 compares the measured characteristics of the reflected light to previously defined parameters and thresholds. The previously defined parameters and thresholds can be internally stored within the comparator 22, or they can be received from a separate memory for the purposes of being used in the comparison operation. The memory is a conventional memory type located within the integrated device 10.

Included within the previously defined parameters are characteristics of the coating to be removed, for example the coating color.

The results of the comparison made by the comparator 22 are sent to the control logic circuit 24 via a data line 42. The comparison determines if the coating is sufficiently removed from the position 52. To make this determination, the wavelength of the reflected light is measured. The reflected light wavelength indicates a color of a top layer of the coated surface 50 at the position 52 after the portion of coating has been ablated by the impinging light 30. If this measured top layer color is substantially the same as a color of the coating to be removed, as defined by the stored coating parameters, then it is determined that a portion of the coating to be removed still remains at the position 52. In this case, the laser pulse is then fired at this position and the system then moves to the next position. This process is repeated for an area until a predetermined percentage of the positions within the area do not require the laser to fire. In this case, the system then moves to the next area.

If the comparison performed by the comparator 22 determines that the top layer color is substantially different than the previously defined coating color, then it is concluded that directing another laser pulse onto the position 52 is not necessary. To move to the next position on the surface, the control logic circuit 24 sends a control signal to the scanning optics 16 via a data line 44. The control signal instructs the scanning optics 16 to realign such that a subsequent laser pulse is directed to a position on the coated surface 50 different than the position 52. After the scanning optics 16 are realigned to a subsequent position, a determination is then made as to whether or not the laser pulse should be fired at the new position.

Although not shown in the figures, individual optical elements within the scanning optics 16 are aligned using any conventional actuating means for physically moving one or more of the individual optical elements. For example, drive gears are connected to the optical elements and a motor is connected to the drive gears. In this example, control signals sent by the control logic circuit 24 to the actuating means, the control signals provide instructions as to the movement of the drive gears using the motor. Additional actuating means can also be included to move the coating removal device 10 relative to the surface 50. The additional actuating means are under the control of the control logic circuit 24 or other control logic circuit working in unison with the control logic circuit 24.

The waste collector 26 collects the waste byproduct resulting from the laser pulse impinging the coated surface 50 and ablating the top layer coating. The waste collector 26 includes a local storage for storing the collected ablated waste byproduct. An alternative waste collector acts as a waste removal apparatus and is coupled to an external waste receptacle such that the collected waste byproduct is transported to the external waste receptacle.

Illumination, as provided by the illuminators 18, and detection of the resulting reflected light, as performed by the photosensitive detector 20, can be accomplished in several different manners. The illuminators can be comprised of one to many individual illuminators that provide illumination from a single wavelength to a wide range of wavelengths. Similarly, the photosensitive detector 20 can comprise one to many sensors for detecting light. One method using a single sensor with a wide spectrum illuminator, constitutes a grayscale sensor that measures the relative lightness of a surface. Another method uses a spectrophotometer sensor that measures a reflectance at hundreds of different wavelengths. The use of multiple sensors allows the sensing to compensate for variations in the tilt of the surface being ablated. Multiple sensors can also be combined with multiple wavelengths. In some embodiments, two color illumination and sensing is implemented where the two colors are red and blue. In this case, the configuration of the illuminators 18 includes two red illuminators and two blue illuminators. Alternatively, more or less than two illuminators can be used. In some embodiments, one or more red illuminators, one or more blue illuminators, and one or more green illuminators are used. It is contemplated that any illumination and sensing techniques can be used that enables the coating removal system to determine the color of a top layer of a coated surface.

The illumination colors can be separated using any conventional technique. One approach uses filters within the photosensitive detector such that the filters separate the colors and send each separated color to a corresponding sensor. Another approach is to separate the colors using a grating. In yet another approach, color separation is performed using a single sensor within the photosensitive detector 20 and separating the colors temporally. To accomplish this in the case of red illuminators and blue illuminators, the red illuminators are energized and the corresponding reflected light is measured by the sensor in the photosensitive detector 20. Then, the blue illuminators are energized and the corresponding reflected light is measured by the same sensor. The order can be reversed such that the blue light is measured prior to the red light.

FIG. 1 shows an exemplary configuration in which the laser path and the reflected light path share common elements, and the illumination path is independent of both the laser path and the reflected light path. Alternative path configurations are also contemplated.

Figure 2:
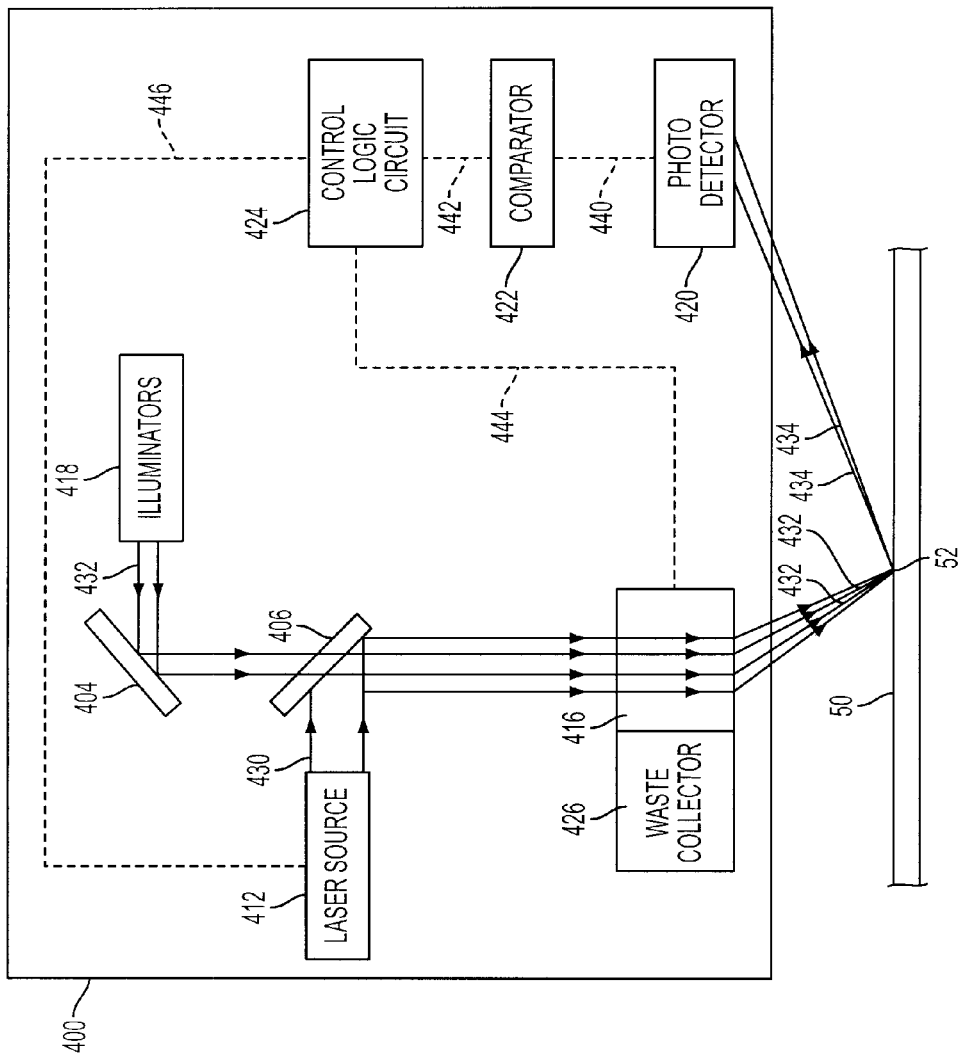
FIG. 2 illustrates an exemplary block diagram of a coating removal device according to another embodiment of the present invention.

FIG. 2 illustrates an exemplary block diagram of a coating removal device according to another embodiment of the present invention. The coating removal device 400 provides a similar function as the coating and removal device 10 (FIG. 1), however, the coating removal device 400 is configured such that the light illumination is directed through the scanning optics and the reflected light is collected directly from the coated surface. The coating removal device 400 is an integrated device that includes a laser source 412, a laser minor 406, scanning optics 416, one or more illuminators 418, a mirror 404, a photosensitive detector 420, a comparator 422, a control logic circuit 424, and a waste collector 426. The laser source 412 operates similarly as the laser source 12 (FIG. 1) to generate a laser pulse, represented as light 430. Light 430 is reflected off the laser minor 406 to the scanning optics 416. Within the scanning optics 416, the light 430 is aligned and focused such that the light 430 impinges a specific position, such as the position 52, on the coated surface 50. In reference to FIG. 2, the laser path includes the laser minor 406 and the scanning optics 416. Upon impinging the position 52, the light 430 ablates a portion of the coating corresponding to the position 52.

The illuminators 418 provide a light illumination 432 to the position 52 on the coated surface 50. Light illumination 432 is reflected off the position 52 as reflected light 434. The reflected light 432 is collected by the photosensitive detector 420 where characteristics of the reflected light are measured. Data corresponding to the measured characteristics is sent from the photosensitive detector 420 to the comparator 422 via a data line 440.

In reference to FIG. 2, the reflected light path is the path from the surface 50 of the photosensitive detector 420, and the illumination path includes the illuminators 418, the mirror 404, the laser mirror 406, and the scanning optics 416. In the coating removal device 400, the laser path and the illumination path share common elements, the laser minor 406 and the scanning optics 416, and the reflected light path is separate from the laser path and the illumination path.

The comparator 422 operates similarly to the comparator 22 (FIG. 1). The results of the comparison made by the comparator 422 are sent to the control logic circuit 424 via a data line 442.

Although not shown in the figures, individual optical elements within the scanning optics 416 are aligned using any conventional actuating means for physically moving one or more of the individual optical elements. For example, drive gears are connected to the optical elements and a motor is connected to the drive gears. In this example, control signals sent by the control logic circuit 424 to the actuating means provide instructions as to the movement of the drive gears using the motor. Additional actuating means can also be included to move the coating removal device 400 relative to the surface 50. The additional actuating means are under the control of the control logic circuit 424 or other control logic circuit working in unison with the control logic circuit 424.

The waste collector 426 collects the waste byproduct resulting from the laser pulse impinging the coated surface 50 and ablating the top layer coating. The waste collector 426 operates in a manner similar to that of the waste collector 26 (FIG. 1).

Figure 3:
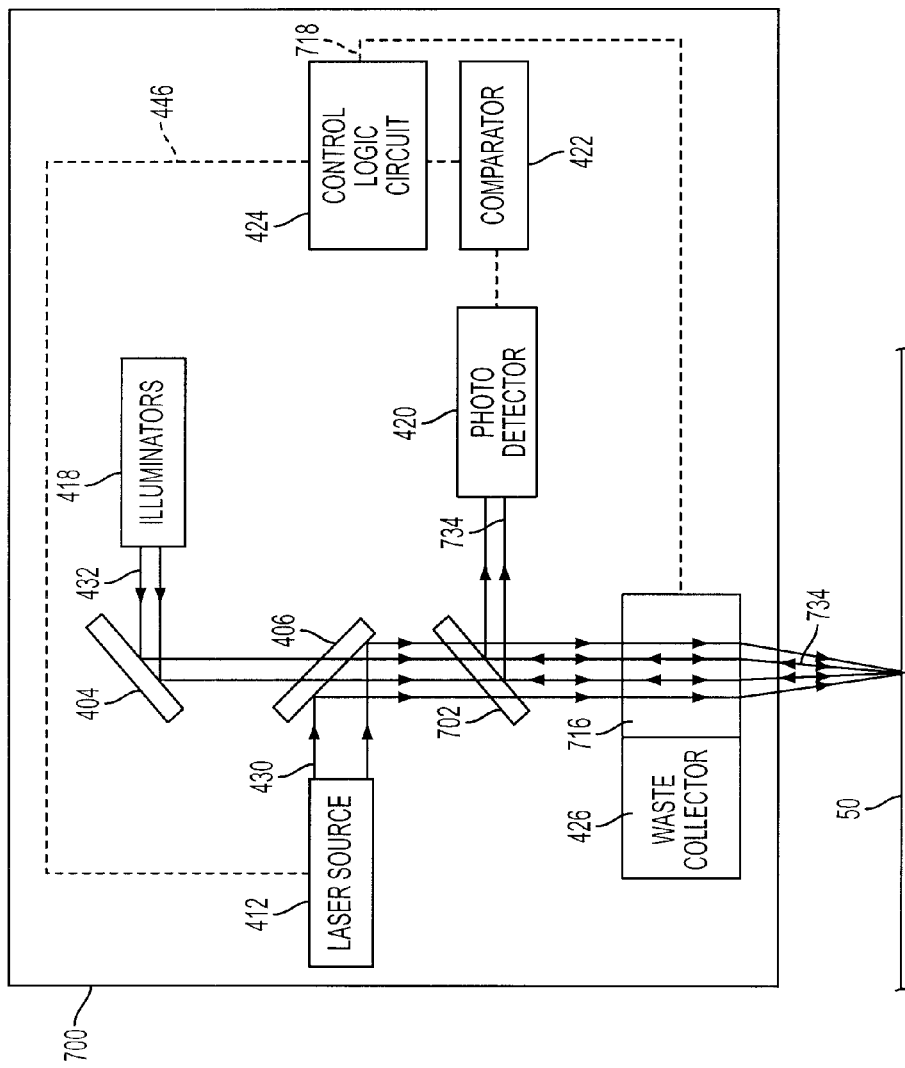
FIG. 3 illustrates a coating removal device according to another embodiment of the present invention.

FIG. 3 illustrates a coating removal device 700 according to another embodiment of the present invention. The coating removal device 700 is an integrated device that includes the laser source 412, the laser mirror 406, scanning optics 716, the one or more illuminators 418, the mirror 404, a beam splitter 704, the photosensitive detector 420, the comparator 422, the control logic circuit 424, and the waste collector 426. The coating removal device 700 provides a similar function as the coating and removal device 400 (FIG. 2), except that the coating removal device 700 is configured such that the reflected light 734 from the surface 50 is directed back through the scanning optics 716. The reflected light 734 is then redirected by the beam splitter 704 to the photosensitive detector 420. In reference to FIG. 3, the laser path includes the laser minor 406, the beam splitter 702, and the scanning optics 716. The reflected light path is the path from the surface 50 to the photosensitive detector 420, including the scanning optics 716 and the beam splitter 702. The illumination path includes the mirror 404, the laser mirror 406, the beam splitter 702, and the scanning optics 716. In the coating removal device 700 of FIG. 3, the reflected light path, the laser path, and the light illumination path all include the scanning optics 716.

Figure 4:
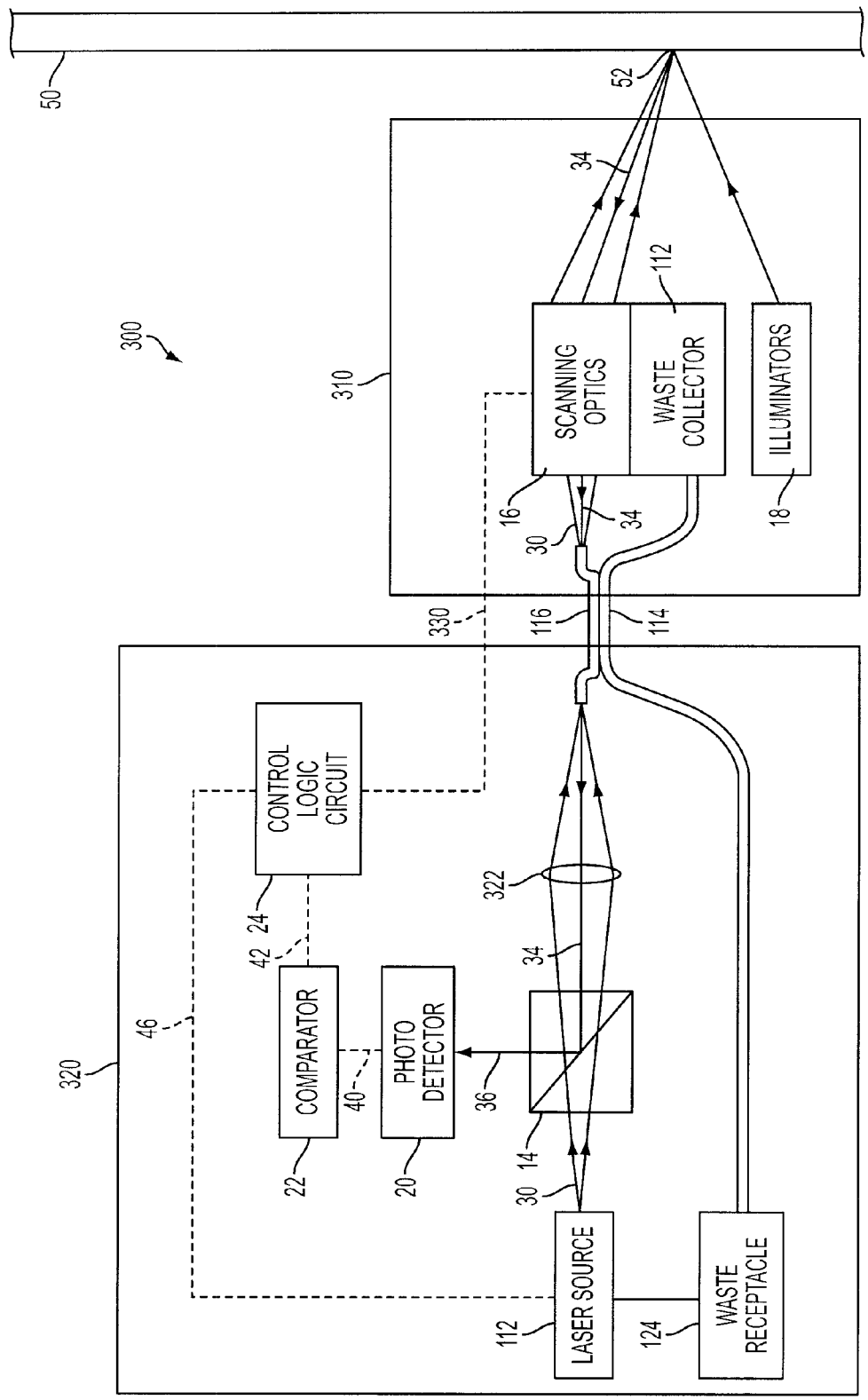
FIG. 4 illustrates a block diagram of a coating removal device according to yet another embodiment of the present invention.

The exemplary configurations shown in FIGS. 1-3 include the coating removal apparatus as a single integrated device. It is alternatively contemplated that the coating removal device includes separate components coupled together, for example a head component and a body component. One such configuration is illustrated in FIG. 4, including a head component 310 coupled to a body component 320. A coating removal device 300 function similarly as the coating removal device 10 of FIG. 1 except that the beam splitter 14, the photosensitive detector 20, the comparator 22, and the control logic circuit 24 are located in the body component 320, and the scanning optics16 are located in the head component 310. The control logic circuit 24, located in the body component 320 sends control signals to the scanning optics 16 in the head component 310 via data line 330. Focusing optics 322 are included in the body component 320 to focus the light 30 into a first end of the fiber optic cable 116. The focusing optics 322 also direct the reflected light 34 received from the fiber optic cable 116 to the beam splitter 14. The head component 310 includes a waste collector 112 that is coupled to a waste receptacle 124 in the body component 320 via waste transport tube 114.

Alternative configurations to the coating removal device 300 are also contemplated. For example, the laser source and waste receptacle can be included in the body component, and the remaining elements are included in the head component. As with the single integrated device configurations, the head component and body component configurations can alternatively be configured such that the reflected light path is separate from the laser path and the illumination path includes common elements as the laser path, or the laser path, the illumination path, and the reflected light path all share common elements.

Numerous different optical configurations can be used within the scanning optics 16, 416, 716 (FIGS. 1-3) to direct the light 30, 430 to the coated surface 50 and to direct the reflected light 34, 434, 734 from the coated surface 50 to the photosensitive detector 20, 420. Any combination of focusing optics, reflecting scanners, refracting scanners, beam splitters, or other conventional optical elements can be used. It is understood that the scanning optics have the ability to be optically configured in any number of different configurations, using any number of optical elements, such that the scanning optics 16 direct a laser light pulse from a first optical position (such as the beam splitter 14) to the coated surface and direct a reflected light from the coated surface back to the first optical position.

Figure 5:
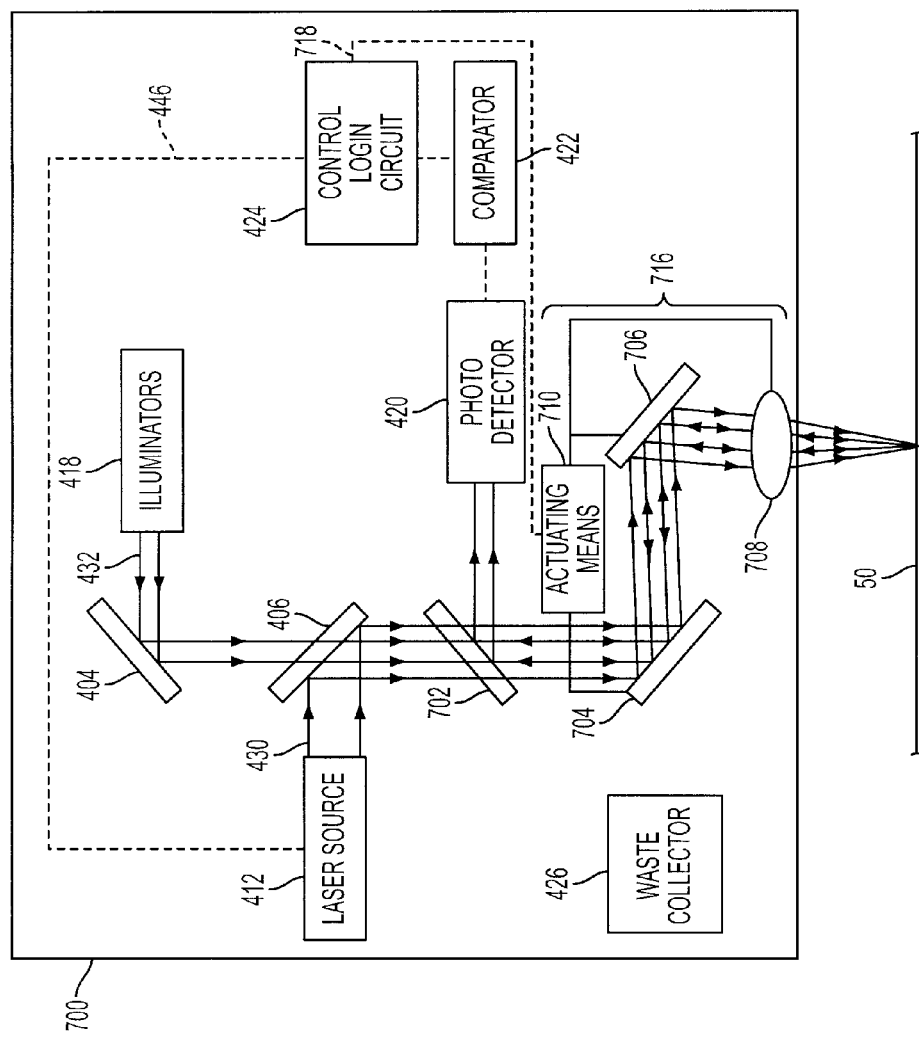
FIG. 5 illustrates the coating removal system including an exemplary configuration of the scanning optics.

FIG. 5 illustrates the coating removal system 700 including an exemplary configuration of the scanning optics 716 (FIG. 3). The scanning optics 716 include focusing optics 708, such as a telecentric scanning lens, reflecting scanners 704 and 706, and actuating means 710. The light 430 is reflected by the reflecting scanners 704 and 706 to the focusing optics 708. The focusing optics 708 direct and focus the light 430 to a position, such as position 52, on the coated surface 50. The exact position on the coated surface 50, and the dimensions of the light impinging the coated surface 50, are determined by the alignments of the scanning optics 708 and the reflecting scanners 704 and 706, which are aligned by the actuating means 710. The actuating means 710 includes any conventional means for properly aligning each of the optical elements within the scanning optics 716, including but not limited to drive gears and a motor. The actuating means 710 is controlled by control signals sent by the control logic circuit 424. The actuating means 710 can also include additional actuating means to move the coating removal device 700 relative to the surface 50. The additional actuating means are under the control of the control logic circuit 424 or other control logic circuit working in unison with the control logic circuit 424. Although the focusing optics 708 are shown in FIG. 5 as single elements, it should be clear to those skilled in the art that the focusing optics 708 can comprise one or more optical elements. Similarly, although two reflecting scanners 704 and 706 are shown in FIG. 5, it should be clear that more, or less than two reflecting scanners can be used. It should also be clear that other types of optical elements can be used in addition to or instead of the optical elements shown in FIG. 5.

The scanning optics direct and focus the laser light to a position, such as position 52, on the coated surface 50. The exact position on the coated surface 50, and the dimensions of the light impinging the coated surface 50, are determined by the alignments of the optical elements within the scanning optics, which are controlled by control signals sent by the control logic circuit.

As described in detail above, each laser pulse generated by the laser source is directed to a predetermined position on the coated surface. After the coating is removed from a first position, the control logic circuit instructs the focusing and scanning optics to align themselves such that a subsequent laser pulse is directed to a second position different than the first position. The control logic circuit determines the desired coating removal pattern according to a stored algorithm or program. In order to provide uniform removal of the coating, the laser pulses are scanned in a controlled uniform manner. Several method are used to provide uniform removal of the coating.

A scanning head is defined as that part of the coating removal device that includes the scanning optics used to direct the laser light onto the surface. In the exemplary configurations shown in FIGS. 1-3 and 5, the scanning head is considered the integrated coating removal device. In the exemplary configuration in FIG. 4, the scanning head is considered the head component 310. A laser scanner is defined as that portion of the scanning optics that enables realignment of the laser light onto different positions of the surface. The laser scanner can be configured using one or more optical elements.

Figure 6:
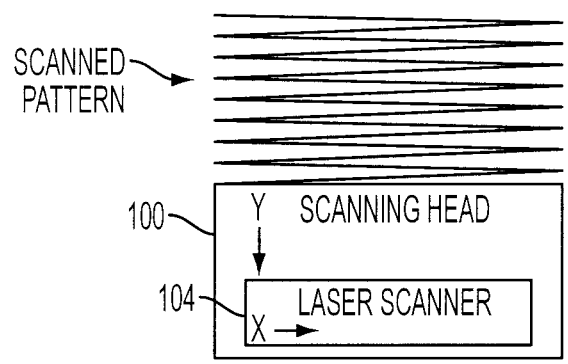
FIG. 6 illustrates a top down view of a simplified block diagram of a scanning head including a single-axis laser scanner.
Figure 7:
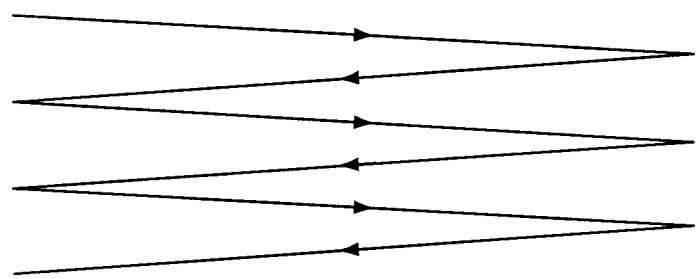
FIG. 7 illustrates an expanded view of a portion of the scanning pattern shown in FIG. 6.
Figure 8:
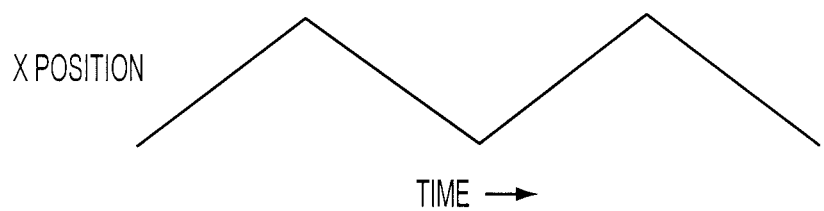
FIG. 8 illustrates the position of the laser scanner of FIG. 6 versus time.

A first method of providing uniform removal of the coating includes a coating removal device configured with a single-axis laser scanner. FIG. 6 illustrates a top down view of a simplified block diagram of a scanning head 100 including a single-axis laser scanner 104. The single-axis laser scanner 104 is configured in this case to scan the laser light along the x-axis on the surface, such as the surface 50 (FIG. 1). An exemplary configuration of one such single-axis scanner is a reflecting scanner, such as the reflecting scanner 704 (FIG. 5), configured to pivot in one dimension, thereby scanning the laser light along a single-axis. The entire scanning head 100 moves along a second axis, in this case the y-axis. The scanning head 100 is configured to move over the surface, in the y-axis, at a constant rate. FIG. 6 also shows the resulting scanning pattern on the surface 50 relative to the scanning head 100. FIG. 7 illustrates an expanded view of a portion of the scanning pattern shown in FIG. 6. FIG. 8 illustrates the position of the laser scanner 104 versus time. The position of the single-axis laser scanner 100 is a measure of the position of the laser light impinging the surface as the single-axis scanner rotates back and forth. As shown in the scanning pattern of FIGS. 7 and 8, the scanning pattern does not provide uniform coverage. In the center of the pattern, the lines are evenly spaced, but at the ends of the pattern, the lines are bunched together. Such a pattern can be improved by moving the scanning head 100 in steps as opposed to at a constant speed. However, the mass of the scanning head precludes the rapid accelerations required for start and stop motions. While the laser scanner 104 limits the width (x-dimension) of the scanning pattern, the length (y-dimension) is limited only by how far the scanning head 100 can be moved. The scanning range of the laser scanner 104 is much less than the movement range of the scanning head 100.

Figure 9:
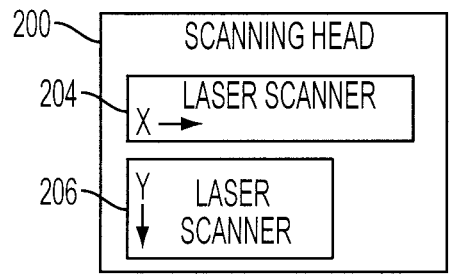
FIG. 9 illustrates a top down view of a simplified block diagram of a scanning head including two single-axis laser scanners.
Figure 10:
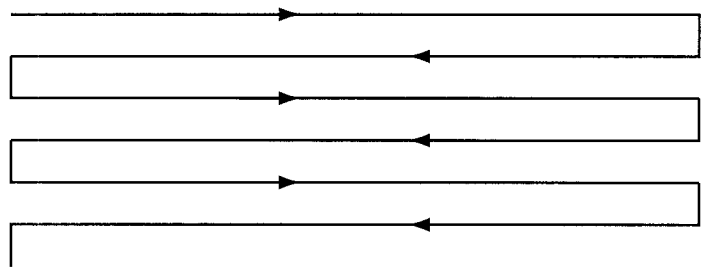
FIG. 10 illustrates an expanded view of the scanning pattern performed by the scanning head of FIG. 9.
Figure 11:
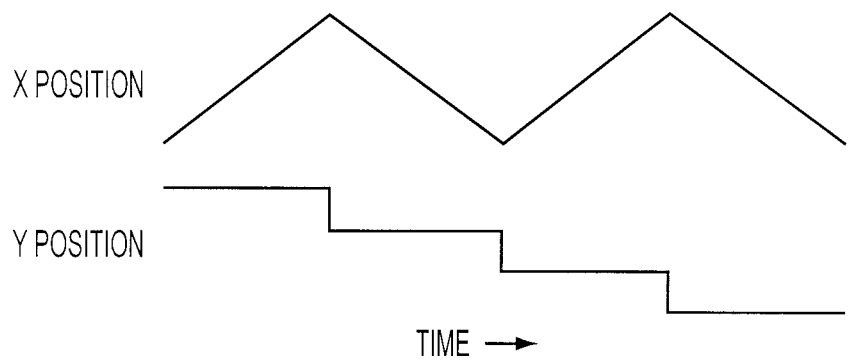
FIG. 11 illustrates the position of the two laser scanners of FIG. 9 versus time.

To solve the uniformity problem of the scanning head with one single-axis laser scanner, a second single-axis scanner is added to the scanning head. This second method of providing uniform removal of the coating uses a coating removal device configured with two single-axis laser scanners. FIG. 9 illustrates a top down view of a simplified block diagram of a scanning head 200 including two single-axis laser scanners. A first single-axis laser scanner 206 is configured to scan the laser light along a first direction, in this case the y-axis. A second single-axis laser scanner 204 is configured to scan the laser light along a second direction, in this case along the x-axis. An exemplary configuration of one such scanning head includes a first reflecting scanner, such as the reflecting scanner 706 (FIG. 5), configured to pivot in one dimension, thereby scanning the laser light along a first axis, and a second reflecting scanner, such as the reflecting scanner 704 (FIG. 5), configured to pivot in a second dimension, thereby scanning the laser light along a second axis. The entire scanning head 200 is held motionless. The laser light is scanned in the two axis using the two laser scanners. FIG. 10 illustrates an expanded view of the scanning pattern performed by the scanning head 200 of FIG. 9. FIG. 11 illustrates the position of the two laser scanners 204, 206 versus time. The position of the second laser scanner 204, which moves in this case in the x-direction, is the same as the single-axis laser scanner in FIG. 6. The position of the first laser scanner 206, which moves in this case in the y-direction, is stationary until the second laser scanner changes direction. The second method provides a scanning pattern with uniform spacing of the rows. The drawback of this configuration is that the scan size of the scanning pattern is limited in both axes by the range of the laser scanners.

Figure 12:
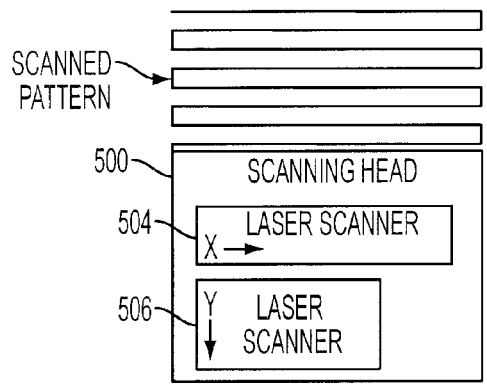
FIG. 12 illustrates a top down view of a simplified block diagram of a scanning head including two single-axis laser scanners.
Figure 13:
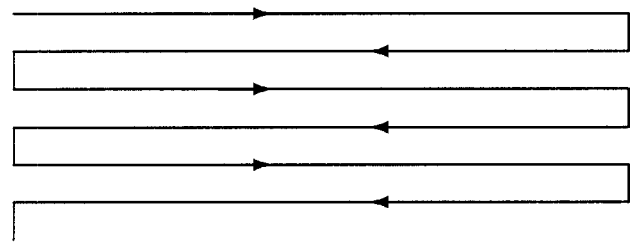
FIG. 13 illustrates an expanded view of a portion of the scanning pattern performed by the scanning head of FIG. 12.
Figure 14:
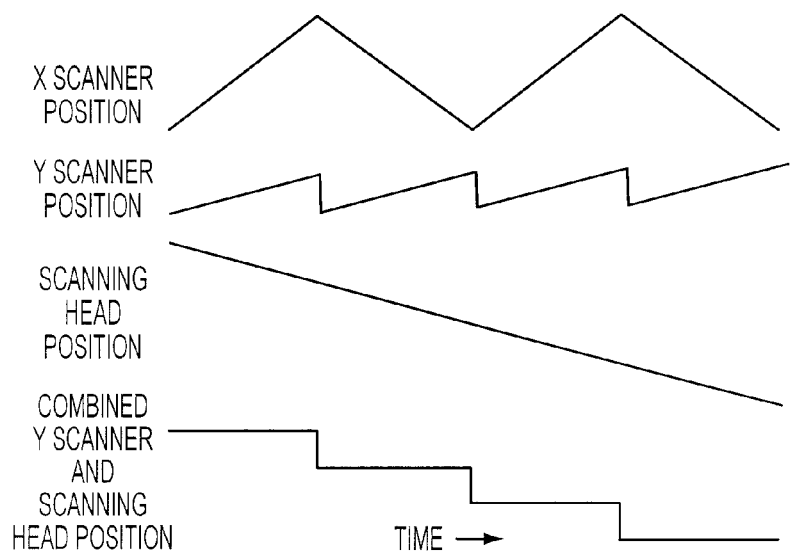
FIG. 14 illustrates the position of the two laser scanners and scanning head of FIG. 12 versus time.

A third method of providing uniform removal of the coating uses a coating removal device that combines the advantage of the long scanning range of the one single-axis scanning head with the uniformity of the two-single-head scanner head. FIG. 12 illustrates a top down view of a simplified block diagram of a scanning head 500 including two single-axis laser scanners. The scanning head 500 is configured to move over the surface, in the y-axis, at a constant rate. FIG. 12 also shows the resulting scanning pattern relative to the scanning head 500. A first single-axis laser scanner 506 is configured to scan the laser light along a first direction, in this case along the x-axis. A second single-axis laser scanner 504 is configured to scan the laser light along a second direction in a pattern similar to the second single-axis laser scanner 204 in FIG. 9. The first single-axis laser scanner 506 functions similarly to the first single-axis laser scanner 206 of FIG. 9 except that the movement patterns are different. FIG. 13 illustrates an expanded view of a portion of the scanning pattern performed by the scanning head 500 of FIG. 12. FIG. 14 illustrates the position of the two laser scanners 504, 506 and scanning head 500 of FIG. 12 versus time. The position of the second single-axis laser scanner 504, which moves in this case in the x-direction, is the same as the second single-axis laser scanner 204 in FIG. 9. Without the first single-axis laser scanner 506, the scanning pattern of the scanning head 500 in FIG. 12 would be the same as the scanning pattern of the scanning head 100 in FIG. 6 because the scanning head 500 in FIG. 12 is also being moved in the y-direction at a constant speed, as is shown in the third graph in FIG. 14. The position of the first single-axis laser scanner 506, which moves in this case in the y-direction, is used to offset the movement of the scanning head 500 in the y-direction. As shown in FIG. 14, the movement of the first single-axis laser scanner 506 is in the exact opposite direction as the movement of the scanning head 500, thereby resulting in a straight line scanning pattern in the x-direction. At the end of each scanning row, as indicated by each change of direction in the x-position graph in FIG. 14, the first single-axis laser scanner 506 is reset to its beginning position. The beginning position corresponds to the far left hand side of the y-position graph in FIG. 14. The bottom graph in FIG. 14 shows the combination of the first single-axis laser scanner 506 and the scanning head 500.

The third method provides a scanning pattern with uniform spacing of the rows in the x-direction, while also providing long scanning range in the y-direction. The signal used to control the first single-axis laser scanner is generated by either an open-loop approach or a closed-loop approach. In the open-loop approach, the scanning head speed, row spacing, and scan time in the x-direction are known values. In the closed loop-approach, feedback is provided where a position of the scanning head is determined and compared to a desired combined y-position, such as the bottom graph in FIG. 14. The result is used to generate a control signal for the movement of the first single-axis laser scanner.

In some embodiments, the coating removal apparatus is configured to remove coating to achieve a desired surface roughness. The surface roughness is measured in situ, in real-time as the coating removal process occurs. A roughness measuring laser source provides a laser light to the surface, thereby generating laser specular reflection and scattered reflections. The magnitude of the reflections at various angles are detected and measured. The measured results are used to calculate the surface roughness.

Figure 17:
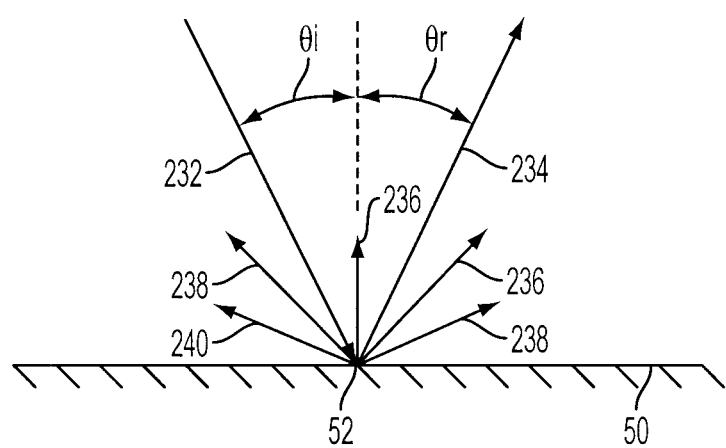
FIG. 17 illustrates an exemplary application of a surface roughness measuring scheme.

FIG. 17 illustrates an exemplary application of a surface roughness measuring scheme. A laser light 232 of suitable power and wavelength impinges on the surface in a region approximate to where the laser processing, such as the laser ablation/photoablation processes described above, is to occur. In some embodiments, the illuminators 18, 418 described above are adapted to provide the laser light used to measure the surface roughness. In other embodiments, a laser light source independent of the illuminators 18, 418 provides the laser light 232 used to measure the surface roughness. The angle of incidence θi of the laser light 232 is the angle from the perpendicular to the surface 50 at the position 52. The angle of incidence θi can be perpendicular to the surface 50 or some other angle to the perpendicular. The primary reflected light 234 is the specular reflection at the primary angle of reflection θr, where the primary angle of reflection θr is equal to the angle of incidence θi. In some embodiments, the photodetector 20, 420 described above is adapted to collect the reflected light at the primary reflection angel θr. In other embodiments, a photodetector independent of the photodetector 20, 420 collects the primary reflected light 234 at the primary reflection angle θr.

In addition to the primary reflected light 234, there are also scattered reflections, such as reflected light 236-240, at other non-primary reflection angles. The magnitude of the reflections at the various angles is dependent on the surface roughness. By placing optical sensors at a number of the various angles, a measurement of the reflected light 234-240 is made. By suitable calculations, a measure of the surface roughness is derived using the measured reflected light 234-240 at the various angles. The calculated surface roughness can be used to determine if subsequent laser light ablation is to be performed to alter the measured surface roughness. The angles at which the non-primary reflections occur are determined by the frequency of the laser light used to measure the surface roughness and the angle of incidence θi, as is well known in the art. The number of non-primary reflection angles at which the scattered light is measured, and the corresponding photosensitive detectors used to detect the scattered light at these angles, is application specific according to the desired degree of accuracy of the measured surface roughness.

In some embodiments, the surface is composed of materials and/or structures that infrared (IR) laser light merely passes through without the desired effects. When the surface to be removed is composed of such materials and/or structures, the coating removal apparatus includes an ultraviolet (UV) laser system. For example, the laser source 12 (FIG. 1) and the laser source 412 (FIGS. 2, 3, 5), and the laser source 112 (FIG. 4) are configured as UV laser sources.

The UV laser system is configured to provide an environmentally "green" composite surface treatment process that is inherently amenable to automation. By directing UV laser light onto the composite substrate in a controlled manner, the surface can be cleaned, textured, and "chemically functionalized" in a highly selective and controlled manner. In contrast to IR laser light, UV laser light is readily absorbed in a very shallow outer layer of the composite surface. This allows the UV laser to achieve a far higher degree of control in processing composite materials.

The UV laser light interacts with the composite substrate surface in such a manner as to create "photoablation" effects. Photoablation occurs when the energy density of the incident laser light is sufficient to break the chemical bonds within the laser-illuminated spot on the target substrate surface. The result is the vaporization of a small volume of material that emits from the surface as a gas or a low-temperature plasma. In some embodiments, the gas that emits from the laser-illuminated spot on the target substrate surface undergoes a fluorescence reaction where the absorption of incident UV laser light in the gas/plasma causes the emission of visible light, typically in the purple-blue wavelengths in the approximate range of 375-475 nanometers. In some embodiments, the photodetectors, such as the photodetector 20 in FIG. 1, are configured as fluorescence sensor(s) that are used in two ways to control the UV laser process. First, the fluorescence sensor(s) senses the fluorescence emissions generated by the UV laser radiation illuminating the gas or plasma emitting from the photoablated area. Second, the fluorescence sensor(s) sense the fluorescence of the composite surface itself or the dyes or marking materials that can be applied to the surface as a process control "marker". This latter technique may rely on laser itself at a reduced power or a UV illumination means distinct from the laser. A typical embodiment would employ UV-emitting LEDs for this purpose. In some embodiments, the illuminators used to provide light illumination to the surface, such as the illuminators 18 in FIG. 1, are configured as secondary UV light sources. In some embodiments, the fluorescence reaction is measured in real-time in order to effect one variation of continuous closed-loop control of the coating removal system.

With the use of a pulsed laser, the photoablation process is performed as a series of discrete photoablation events that correspond to the impingement of individual laser pulses against the substrate surface. This process allows for very accurately controlled laser effects that can readily achieve consistent photoablation depths. In an exemplary application, photoablation depths can be controlled with a resolution of about 1 to about 2 microns.

During operation of the UV laser system, very brief laser pulses are directed against the substrate from a scanning head incorporating novel technology. In some embodiments, each laser pulse has a pulse width in the range of femtoseconds ($10^{-12}$ seconds) to microseconds ($10^{-6}$ seconds). The laser output optics in the scanning head are configured to illuminate a small spot on the target substrate with each laser pulse. In some embodiments, the laser-illuminated spot is typically in the range of about 5 to about 500 microns in diameter. The scanning mechanism repositions the laser optics to an adjacent spot before the next laser pulse is transmitted through the beam delivery system, as described in detail above. In some embodiments, the scanning head is configured with closed-loop electronic laser control interlocks in order to assure that the laser energy is uniformly applied to the substrate. Such exemplary configurations are included in the coating removal systems of FIGS. 1-5. In some embodiments, the position of the scanning head relative to the to the target substrate or work piece is measured with a position encoder and the control function is performed with digital computer circuits. The position encoder can be comprised of existing devices such as a rotary encoder or an optical position sensor.

The laser scanning head is located at the end of the laser light delivery system. In some embodiments, the scanning head employs an oscillating galvanometer or rotary scanning mechanism to translate the laser focal spot across the surface of the target substrate in a controlled manner. In some embodiments, the laser generates pulse repetition rates in the range of about 5 KHz to about 500 KHz.

In this manner, the UV laser system generates an essentially uniform deposition of UV laser energy on the substrate in the form of many laser-illuminated spots. The scanning head executes a programmed raster pattern that compensates for the motion of the scanning head and produces a uniform deposition of laser energy on the composite substrate surface, for example the laser scanning head 500 in FIG. 12.

The UV laser system can be configured with several types of conventional available UV lasers, including but not limited to excimer (gas) lasers, diode-pumped solid-state lasers, and fiber lasers. In the latter two cases, frequency tripling (third harmonic) is accomplished with nonlinear optical material in order to produce laser radiation in the utilized UV wavelengths. In the case of excimer lasers, several different wavelengths can be employed, including but not limited to 308 nm (xenon chloride), 248 nm (krypton fluoride), and 193 nm (argon fluoride) types. The UV laser comprises a source of laser light that is fed into the laser light delivery system and then scanned onto the target substrate in a controlled manner by the scanning head. The type of laser selected for a given application depends on a number of technical factors, including but not limited to power level, wavelength, pulse repetition rate, beam quality, and cost.

The UV laser system employs a pulsed UV laser to generate an in-situ plasma of controlled chemistry at the laser-illuminated substrate surface. The laser-induced plasma causes beneficial changes in the chemical and physical characteristics of the substrate surface under controlled conditions. Laser process parameters, including energy density delivered to the substrate, laser radiation wavelength, pulse energy, pulse duration, pulse repetition rate, beam quality, and others can all be adjusted to produce the desired effects on the substrate material.

The interaction of the UV laser light with the composite material simultaneously produces multiple effects: The photoablation of the composite surface with overlapping laser-illuminated spots generates a textured surface that enhances adhesive bond strength and coatings adhesion. The UV laser energy vaporizes deleterious organic contaminants, including mold release agents, on the composite surface thus enhancing bond strength and coatings adhesion. The UV laser energy beneficially alters the "chemical functionalities" of the composite surface, thus enhancing bond strength and coatings adhesion at the molecular level. The altered chemical functionalities include surface energy, bond state, and molecular composition.

In some embodiments of the UV laser system, the laser effects are enhanced by the use of a gas flow that creates a controlled environment at the substrate surface where the laser energy is directed. The types of gases used for this purpose include but are not limited to nitrogen, oxygen, hydrogen, argon, and helium. Both reactive and non-reactive gases can be used, depending upon the specific surface effects that are desired. In certain applications, controlled mixtures of gases are used.

Gas flow is directed to the substrate surface at what is referred to as a laser process zone. The introduction of gas flows into the laser process zone at the substrate surface is intended to control the chemical composition of the plasma that is generated when the UV laser pulses illuminate the substrate surface. By controlling the partial pressure of gaseous species in the laser process zone, the chemistry of the laser plasma is tailored to produce specific chemical functionality effects at the composite surface. These effects include but are not limited to polymerization, non-polymerization, crosslinking polymer fragmentation, oxidation, gas incorporation, and surface energy modification. Chemical functionality effects, in turn, control material properties such as adhesion, surface friction, permeability, surface energy (wettability and water repellency), surface conductivity, biocompatibility, and optical properties such as reflectance.

Figure 15:
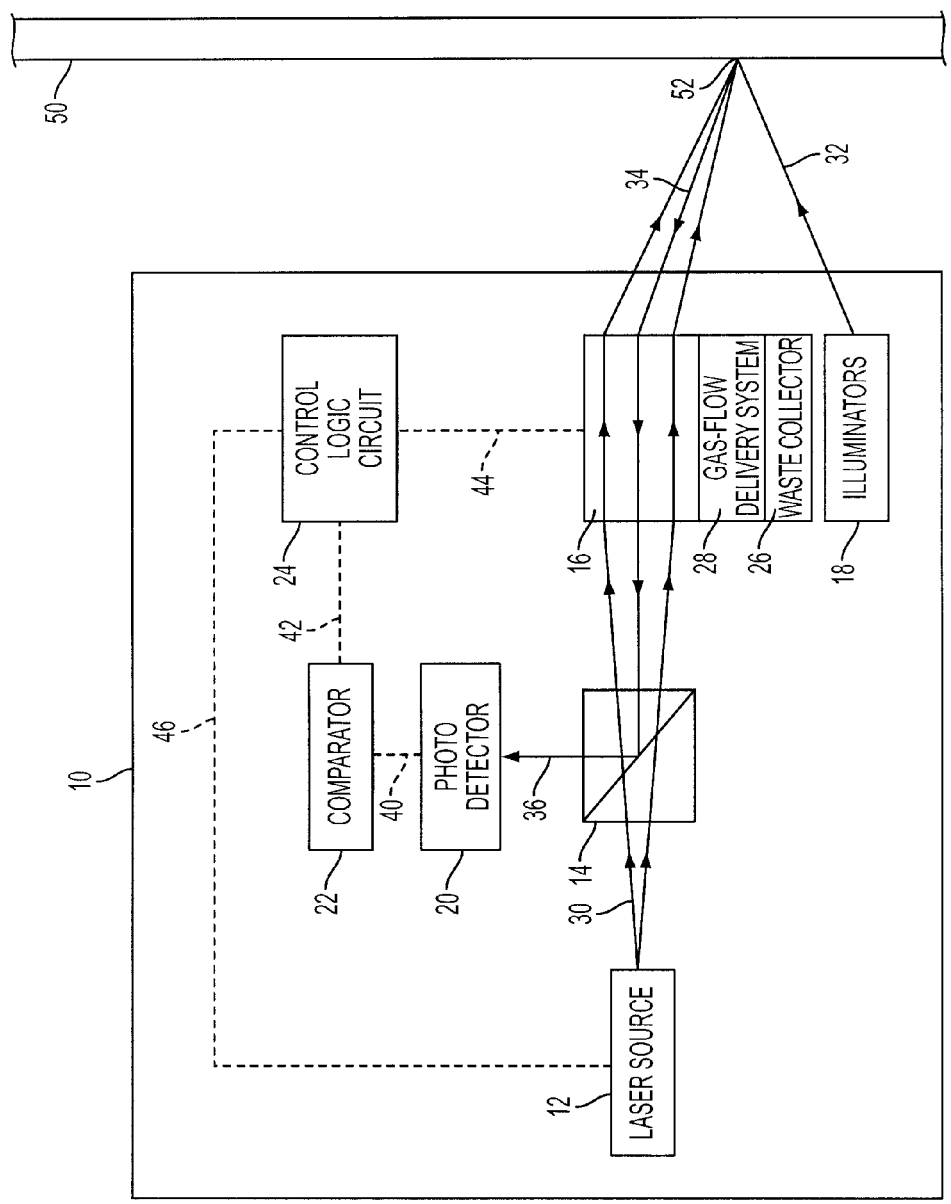
FIG. 15 illustrates an exemplary block diagram of the coating removal device of FIG. 1 including a gas flow delivery system.

In some embodiments, the method of introduction of these gases into the laser process zone is similar to inert gas shielding practices employed in gas tungsten arc welding (GTAW) and gas metal arc welding (GMAW) procedures per American Welding Society (AWS) methodology. Using such a dynamic gas shielding technique, controlled gas flow is continuously introduced as the laser scanning head moves across the target substrate. In this manner, a controlled gas atmosphere is maintained in the laser process zone at the substrate surface under the moving laser scanning head. Waste gas and the resulting photoablated material are removed as waste FIG. 15 illustrates an exemplary block diagram of the coating removal device 10 of FIG. 1 including a gas flow delivery system. The gas flow delivery system 28 is configured to provide a continuous gas flow to the laser process zone across the target surface 50, and specifically over each target position on the surface, such as the position 52. In some embodiments, the gas flow delivery system 28 is configured to operate according to a dynamic gas shielding technique.

Another embodiment of a gas-assisted UV laser system includes the introduction of controlled gas compositions into a closed chamber in which the laser process is conducted. Such a configuration includes a work piece, such as a surface, positioned inside of a vessel containing the specified gas atmosphere. The UV laser system acts on the work piece through one or more optical penetrations of the vessel wall(s). This is similar to a "glove box" arc welding process where the gas shielding is comprised of a controlled atmosphere within a closed vessel that contains the work piece or substrate. In some applications, a partial vacuum is employed to facilitate the introduction of the desired gas atmosphere into the vessel.

Figure 16:
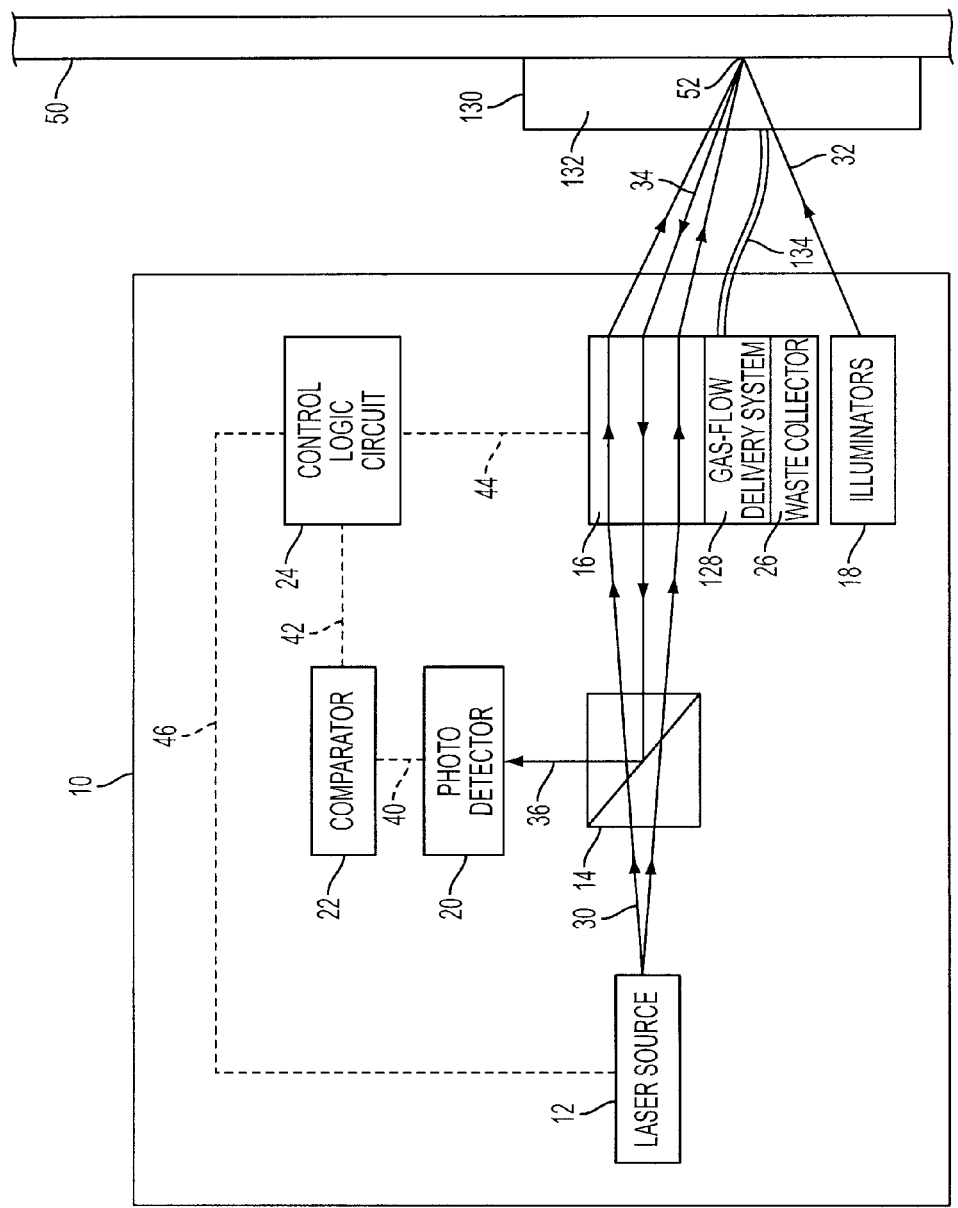
FIG. 16 illustrates an exemplary block diagram of the coating removal device of FIG. 1 including a gas flow delivery system and controlled gas chamber.

FIG. 16 illustrates an exemplary block diagram of the coating removal device 10 of FIG. 1 including a gas flow delivery system and controlled gas chamber. The gas flow delivery system 128 is configured to provide a continuous gas flow to a vessel 130 via a gas transport tube 134. A chamber 132 is formed within the vessel 130, into which the gas flows, thereby generating a controlled laser process zone across the target surface 50, and specifically over each target position on the surface, such as the position 52. In some embodiments, the vessel 130 includes optically transparent portions (not shwon) through which the light illumination, the UV laser light, and the reflected light pass. In other embodiments, the entire vessel 130 is optically transparent.

In some embodiments, the waste collector, such as the waste collector 26 in FIGS. 15 and 16, is configured as a vacuum extraction system that functions to remove vapor and particulate waste products that issue from the laser treated surface during processing. The vacuum system is typically configured with an annular extractor means that is integrated with the laser scanning head. The vacuum extractor prevents the condensation or re-deposition of vaporous or particulate waste products back onto the laser-treated surfaces during processing. This is an important element in preserving the cleanliness and surface properties of the as-treated surfaces following laser processing. The vacuum extraction system also serves to substantially prevent the laser-generated waste products from contaminating the laser optics contained in the scanning head, thus reducing the maintenance required for continuous operation of the laser system in a manufacturing environment.

In some embodiments, the vacuum extraction system captures the laser-generated vapor and particulate wastes in a high-efficiency particulate air (HEPA) filter. This vacuum extraction/filtration means incorporated into the laser system provides significant advantages for the laser process in terms of environmental impact. The UV laser process breaks the chemical bonds between monomers and the cross-linking between long-chain hydrocarbon molecules that are the bases of polymer and composite matrix materials. Accordingly, most of the solid material removed by the UV laser photoablation process is reduced to atomic, molecular, and monomer species within a fluorescent gas medium that issues from the laser-illuminated area during the impingement of each laser pulse on the substrate surface. The remainder of the photoablated material is reduced to fine particulate. Since these waste products are captured efficiently by the HEPA filter, the laser process is inherently an environmentally "green" process in which the wastes represent only a small mass-fraction of the total processed material volume and the waste products can be sequestered as solids in a small filter element suitable for conforming waste disposal practices.

An advantage of the coating removal system is the incorporation of active, closed-loop controls that modulate the output of the laser in real time during operation of the system. The use of closed-loop laser controls entails active interrogation of the substrate surface at intervals that equal or approximate the pulse repetition rate of the laser process. The sensors incorporated in the closed-loop controls measure the physical properties of the laser interaction with the substrate and/or the physical properties of the laser-treated substrate surface in real time, thus providing an electronic feedback loop for the laser control interlocks.

Another advantage of the coating removal system is the use of a pulsed UV laser to create an in-situ fluorescent gas or low-grade plasma at the laser-illuminated substrate surface. The laser-induced gas or plasma causes beneficial changes in the chemical and physical characteristics of the substrate surface under controlled conditions. Owing to the persistence of the fluorescent gas or plasma, it effectively acts on the substrate surface in a continuous manner owing to the high pulse repetition rates employed in the UV laser process that sustain the fluorescence reaction. The laser process parameters, including energy density delivered to the substrate, laser radiation wavelength, pulse energy, pulse duration, pulse repetition rate, beam quality, and others can all be adjusted to produce the desired effects on the substrate material.

Although the gas-assisted UV laser system embodiments, are shown in FIGS. 15 and 16 as being configured within the coating removal device 10, it is understood that the gas-assisted UV laser system can be configured within any coating removal device, including the coating removal devices 300, 400, and 700.

In some laser applications, for example applications designed for processing smaller parts or subassemblies, the laser beam delivery system is stationary and the target substrate is moved via a mechanical means relative to the laser. In some embodiments, this type of laser system is configured with cabinet-type enclosures that facilitate the introduction of controlled gas atmospheres in the laser process zone.

The optical paths of the various embodiments described above, including the laser light path, the light illumination path, and the color sensing path, are for exemplary purposes only. It is understood that alternative configurations, including various combinations and numbers of conventional optical elements can be used to achieve the desired functionalities of the coating removal device described above.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A laser-based system to measure a surface roughness, the system comprising:
   a. a laser source to provide a laser light having a light illumination path, wherein the laser source is aligned to direct the laser light onto a position on the surface at an angle of incidence;
   b. a plurality of photosensitive detectors each configured to receive light reflected from the surface as a result of the laser light impinging the position on the surface, wherein the reflected light comprises a light reflection path separate from the light illumination path, and to measure a magnitude of the reflected light received, wherein a first photosensitive detector is positioned at a primary angle of reflection and is configured to measure a primary specular reflected light, and each of a remaining number of photosensitive detectors is positioned at a non-primary angle of reflection and is configured to measure non-primary scattered reflected light; and
   c. a comparator coupled to each of the plurality of photosensitive detectors and configured to calculate a surface roughness of the surface according to the magnitude of reflected light measured at each of the plurality of photosensitive detectors.

2. The system of claim 1 wherein the angle of incidence is equal to the primary angle of reflection.

3. A method of measuring a surface roughness, the method comprising:
   a. providing a laser light having a light illumination path;
   b. directing the laser light onto a position on the surface at an angle of incidence;
   c. positioning a plurality of photosensitive detectors for detecting reflected light, the reflected light comprising a light reflection path separate from the light illumination path, wherein a first photosensitive detector is positioned at a primary angle of reflection to receive specular reflected light from the surface as a result of the laser light impinging the position on the surface, and each of a remaining number of photosensitive detectors is positioned at a non-primary angle of reflection to receive non-primary scattered reflected light;
   d. measuring a magnitude of reflected light at each of the plurality of photosensitive detectors; and
   e. calculating a surface roughness of the surface according to the magnitude of reflected light measured at each of the plurality of photosensitive detectors.

4. The method of claim 3 wherein the angle of incidence is equal to the primary angle of reflection.

* * * * *